United States Patent
Rivoalen et al.

(10) Patent No.: US 11,736,548 B2
(45) Date of Patent: Aug. 22, 2023

(54) RENDERING OF BACKGROUND OR PICTURE-IN-PICTURE CONTENT AS PART OF AN HTTP ADAPTIVE STREAMING (HAS)

(71) Applicant: ORANGE, Issy-les-Moulineaux (FR)

(72) Inventors: Mathieu Rivoalen, Châtillon (FR); Hervé Marchand, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/612,814

(22) PCT Filed: May 12, 2020

(86) PCT No.: PCT/EP2020/063109
§ 371 (c)(1),
(2) Date: Nov. 19, 2021

(87) PCT Pub. No.: WO2020/234030
PCT Pub. Date: Nov. 26, 2020

(65) Prior Publication Data
US 2022/0224745 A1  Jul. 14, 2022

(30) Foreign Application Priority Data
May 20, 2019 (FR) ...................................... 1905266

(51) Int. Cl.
*H04L 65/65* (2022.01)
*H04L 65/75* (2022.01)
*H04L 67/02* (2022.01)

(52) U.S. Cl.
CPC ............. *H04L 65/65* (2022.05); *H04L 65/75* (2022.05); *H04L 67/02* (2013.01)

(58) Field of Classification Search
CPC ........... H04N 21/2662; H04N 21/4345; H04N 21/2365; H04N 21/4316; H04N 5/2624
See application file for complete search history.

(56) References Cited

U.S. PATENT DOCUMENTS 10,123,027 B2 * 11/2018 Hannuksela ......... H04N 13/161
10,148,902 B1 * 12/2018 Ho .................. H04N 21/440272
(Continued)

FOREIGN PATENT DOCUMENTS

| EP | 3226573 A1 | 10/2017 |
| EP | 3393129 A1 | 10/2018 |
| FR | 3021489 A1 | 11/2015 |

OTHER PUBLICATIONS

English translation of the Written Opinion of the International Searching Authority dated Jun. 15, 2020 for corresponding International Application No. PCT/EP2020/063109, filed May 12, 2020.
(Continued)

*Primary Examiner* — Chirag R Patel
(74) *Attorney, Agent, or Firm* — David D. Brush; Westman, Champlin & Koehler, P.A

(57) ABSTRACT

A method for managing HTTP adaptive streaming of digital content within a real-time multimedia stream player terminal, associated with a terminal for rendering the digital content. The method includes obtaining a description file for the digital content, including a list of time segments of the content each associated with a plurality of content encoding rates; and downloading time segments at one of the encoding rates. The method implements a concomitant rendering, by the rendering terminal, of the digital content and of an element, called main element, belonging to a group including a menu and other digital content. The method implements, during the downloading step, a partial downloading of a preliminary portion of at least some of the time segments, and a rendering, for a duration of one of the time segments, of a picture decoded from the preliminary portion of the corresponding time segment.

12 Claims, 3 Drawing Sheets

(56) References Cited

U.S. PATENT DOCUMENTS

| | | |
|---|---|---|
| 10,291,677 B2 | 5/2019 | Marchand et al. |
| 2015/0312303 A1* | 10/2015 | Krishna .................. H04L 65/80 |
| | | 709/219 |
| 2015/0341411 A1* | 11/2015 | Huber ..................... H04L 65/75 |
| | | 709/231 |
| 2015/0341412 A1* | 11/2015 | Marchand ........ H04N 21/44209 |
| | | 709/219 |

OTHER PUBLICATIONS

International Search Report dated Jun. 3, 2020 for corresponding International Application No. PCT/EP2020/063109, May 12, 2020.
Written Opinion of the International Searching Authority dated Jun. 3, 2020 for corresponding International Application No. PCT/EP2020/063109, filed May 12, 2020.

* cited by examiner

[Fig 1]
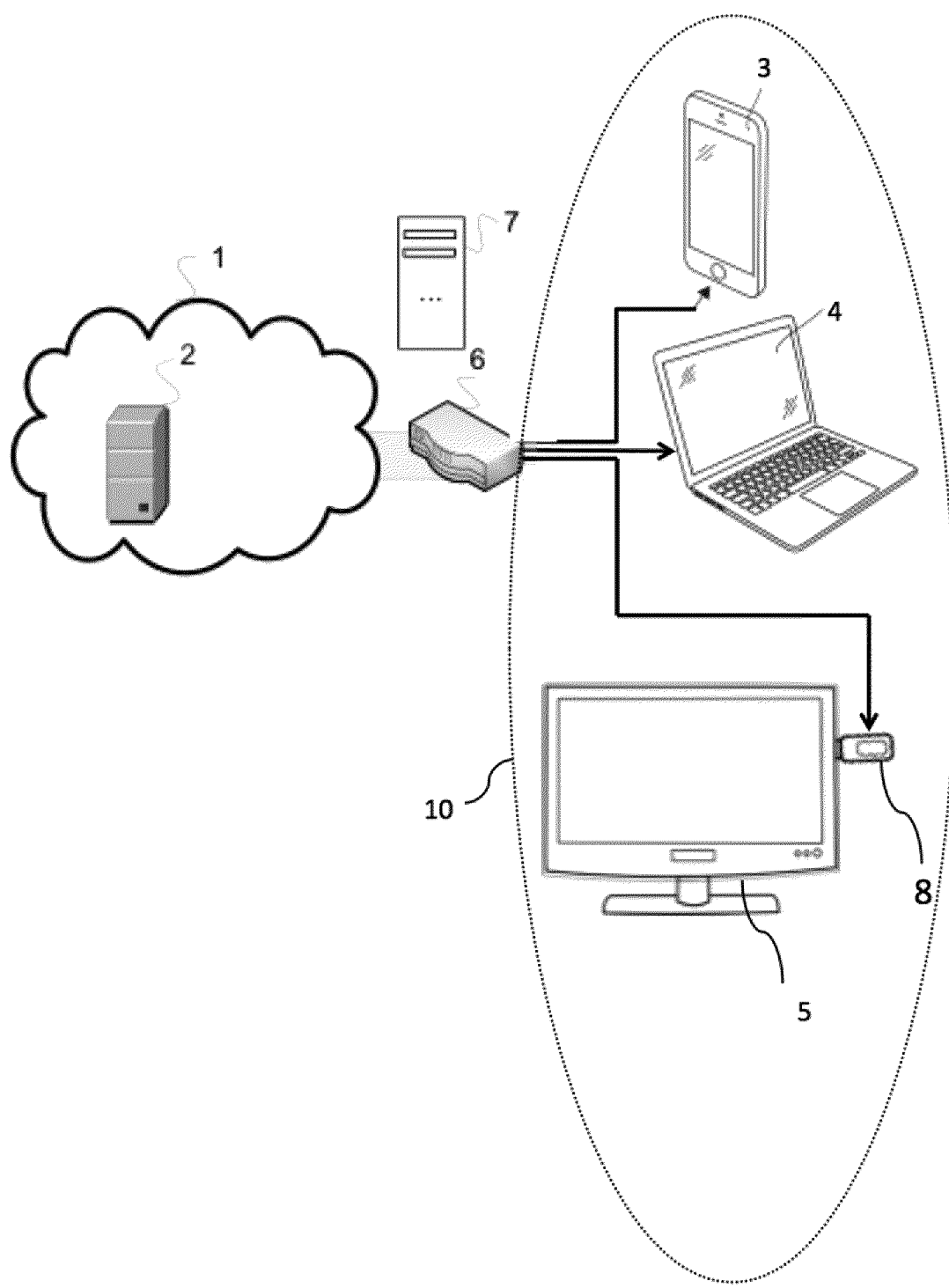

[Fig 2]
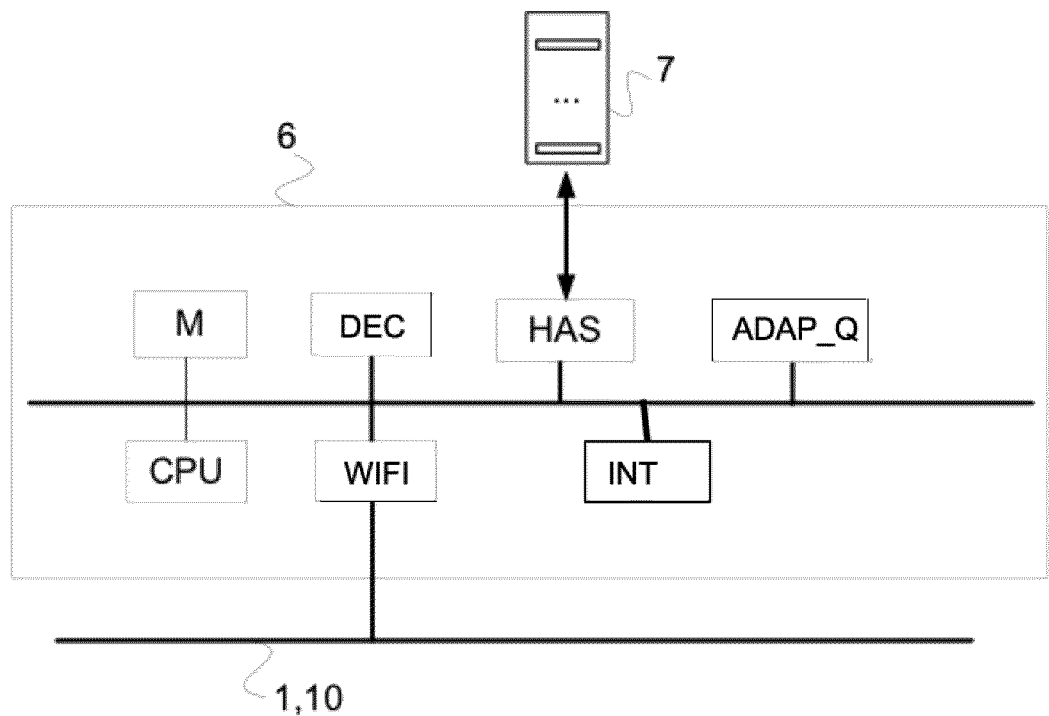
[Fig 3]
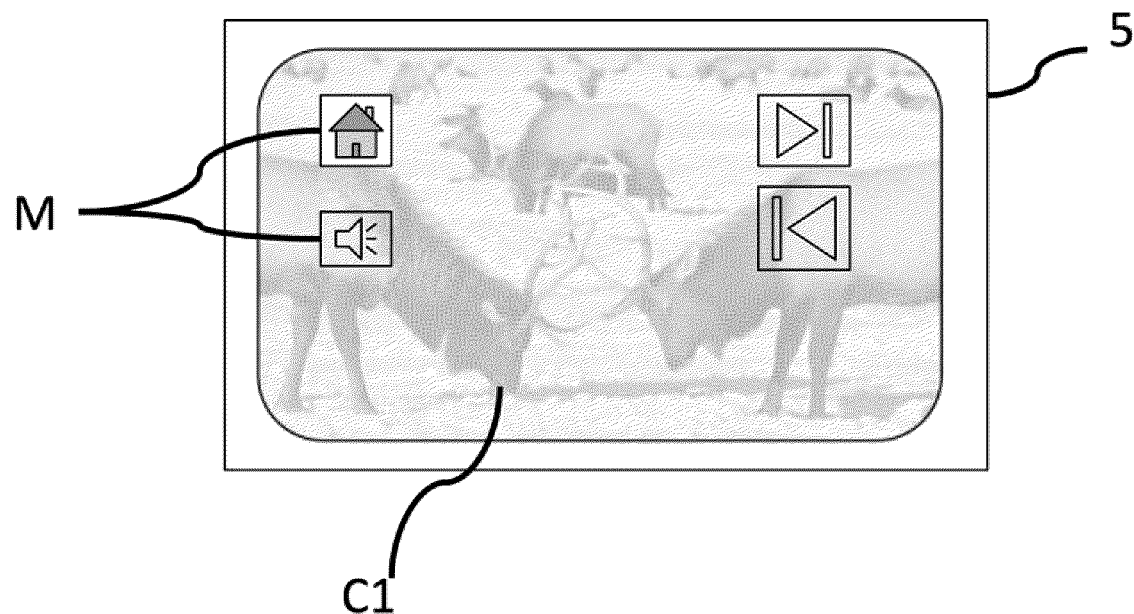

[Fig 4]
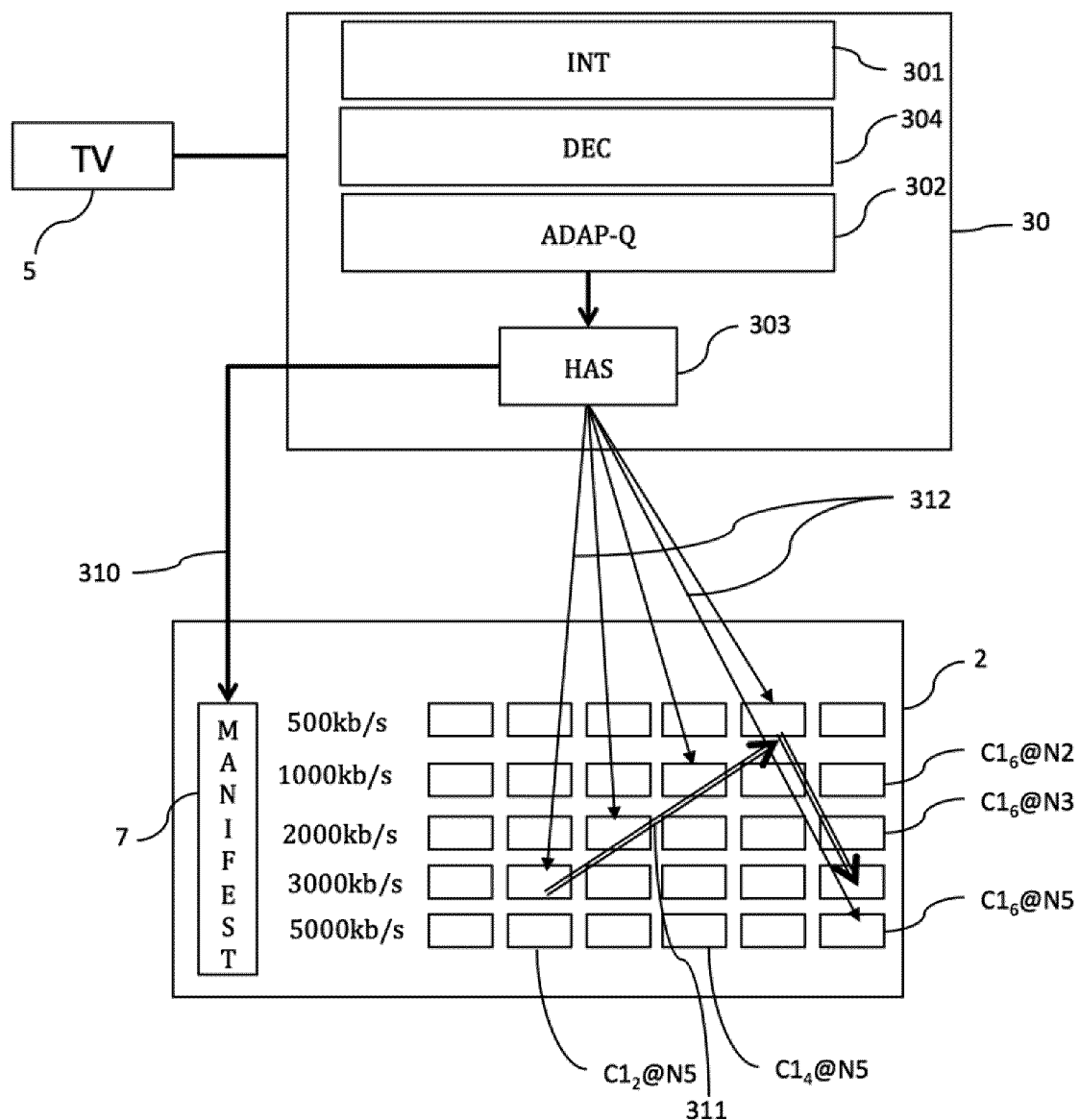

RENDERING OF BACKGROUND OR PICTURE-IN-PICTURE CONTENT AS PART OF AN HTTP ADAPTIVE STREAMING (HAS)

CROSS-REFERENCE TO RELATED APPLICATIONS

This Application is a Section 371 National Stage Application of International Application No. PCT/EP2020/063109, filed May 12, 2020, which is incorporated by reference in its entirety and published as WO 2020/234030 A1 on Nov. 26, 2020, not in English.

TECHNICAL FIELD

The field of the invention is that of the broadcasting of digital multimedia contents, namely digital video and/or audio contents. More specifically, the invention relates to the rendering of such a content, as a background or PiP (Picture-in-Picture) type content, within the scope of the routing of digital contents according to a so-called HTTP adaptive streaming or HAS technique.

PRIOR ART

Access to multimedia content, such as television or video on demand, from a network of Internet type, is currently possible, for most rendering terminals, particularly when they belong to a local communication network, such as a home network.

The terminal generally emits a request to a server, by indicating the chosen content and it receives in return a stream of digital data relating to this content. Within the scope of a local communication network, such a request transits through the access gateway to the network, for example the residential gateway.

The terminal is adapted to receive these digital contents in the form of multimedia data and to produce a rendering thereof. This rendering involves providing at the terminal the digital content in a form accessible to the user. For example, data received corresponding to a video are generally decoded, then rendered at the terminal in the form of a display of the corresponding video with its associated sound track. In the following, in the interest of simplification, the digital content will be assimilated as a video and the rendering by the terminal, or consumption by the user of the terminal, as a viewing on the screen of the terminal.

The broadcasting of digital contents over the Internet is often based on client-server protocols of the HTTP (Hyper Text Transport Protocol) family. In particular, the downloading in progressive mode of digital contents, also called streaming, makes it possible to transport and consume the data in real time, that is to say that the digital data are transmitted over the network and rendered by the terminal as and when they arrive. The terminal receives and stores a portion of the digital data in a buffer memory before rendering them. This distribution mode is particularly useful when the bitrate that the user disposes is not guaranteed for the real-time transfer of the video.

HTTP adaptive streaming (HAS for short), what is more makes it possible to broadcast and receive data according to various qualities corresponding for example to various bitrates. These various qualities are described in a parameter file available by downloading on a data server, for example a content server. When the client terminal desires to access a content, this description file makes it possible to select the correct format for the content to be consumed depending on the available bandwidth or the storage and decoding capacities of the client terminal. This type of technique particularly makes it possible to take into account variations in bandwidth on the link between the client terminal and the content server.

A plurality of technical solutions exist to facilitate the distribution of such a content by streaming, such as for example the proprietary solutions Microsoft® Smooth Streaming, Apple® HLS, Adobe® HTTP Dynamic Streaming or the MPEG-DASH standard of the ISO/IEC organisation that will be described hereafter. These methods propose to send to the client one or more intermediate description files, also called documents or manifests, containing the addresses of the various segments with the various qualities of the multimedia content.

Thus, the MPEG-DASH (Dynamic Adaptive Streaming over HTTP) standard is a format standard for audiovisual broadcasting over the Internet. It is based on the preparation of the content in various presentations of variable quality and bitrate, sliced into short-term segments (in the order of a few seconds), also called chunks. Each of these segments is rendered available individually by means of an exchange protocol. The protocol mainly targeted is the HTTP protocol, but other protocols (for example FTP) may also be used. The organisation of segments and the associated parameters are published in a manifest in XML format.

The underlying principle to this standard is that the MPEG-DASH client performs an estimation of the available bandwidth for the receipt of segments, and, depending on the filling of its reception buffer, chooses, for the next segment to be loaded, a representation the bitrate of which:
  ensures the best possible quality,
  and makes possible a reception delay compatible with the uninterrupted rendering of the content.

Thus, in order to adapt to the variation of network conditions, particularly in terms of bandwidth, the existing adaptive streaming solutions make it possible for the client terminal to switch from an encoded version of the content at a certain bitrate, to another encoded at another bitrate, during the downloading. Indeed, each version of the content is divided into segments of the same duration. In order to make it possible to continuously render the content on the terminal, each segment must reach the terminal before its programmed rendering instant. On the one hand, the perceived quality associated with a segment increases with the size of the segment, expressed in bits, but on the other hand, larger segments require a longer transmission time, and therefore have an increased risk of not being received in time for a continuous rendering of the content.

The rendering terminal must therefore find a compromise between the overall quality of the content, and its uninterrupted rendering, by carefully choosing the next segment to be downloaded, from the various encoding rates proposed. For this, various algorithms exist for selecting the quality of the content depending on the available bandwidth, which may have more or less aggressive, or more or less secure strategies.

The consumption of digital contents during HTTP adaptive streaming (HAS) is tending to become more accessible. It is particularly used by many streaming services, but also by certain TV decoders, or set-top-boxes, which use it to access offline content, such as Video on Demand (VOD), the pre-recording of television programmes (Replay), or offers of the type Network PVR (Network Personal Video Recorder, i.e. a service for recording digital contents, performed by the content provider itself rather than in the home of the end user).

Furthermore, other devices such as real-time multimedia stream player devices also access digital contents in HTTP adaptive streaming mode for real-time (or Live) televisual contents. This is the case for example of the Chromecast® device developed by Google®, or of the CléTV® from Orange®.

Such devices conventionally plug into the HDMI port of a television and communicate, by Wi-Fi® connection, with another device of the home communication network connected to a wide area communication network of Internet type (residential gateway, computer, smartphone, tablet, etc.), in order to render, on the television, the multimedia content received by a compatible software application. These devices will subsequently be designated under the generic designation of HDMI key.

Moreover, other rendering terminals exist that do not use this HTTP adaptive streaming technique, but on the contrary make it possible for the user to access the content according to a so-called multicast technology. According to this multicast technique, a set of receiver terminals interested in the same content form a broadcasting group. The content server sends the data packets relating to this content once, and they are routed towards all of the terminals of the broadcasting group. Their replication occurs as close to the receiver terminals as possible. This technology therefore only has little impact on the end-to-end bandwidth consumption, because it is completely distributed.

This multicast technology is particularly used by television over IP (Internet Protocol) systems to broadcast the content of televised channels to a large number of subscribers, most often via the use of a set top box. The corresponding rendering terminals most often propose to their users a user interface, or HMI, making it possible for them to access the main menu of the television over IP service, wherein the stream of one of the television channels is displayed in the background of the menu, or in PiP (Picture-in-Picture) form on the screen of the rendering terminal.

This user interface, which makes it possible for example for the user to view a video in the background of the main menu, or to view a secondary television channel as picture in picture on the screen that renders a main television channel, offers an experience and a service particularly appreciated by users. Moreover, it has little impact on the consumption of the stream and of the bandwidth in the network, due to the multicast technology used.

On the other hand, it is not currently proposed by the OTT (Over The Top) type services that are based on HAS type streaming, because it is common, on this type of service, to prevent the client from consuming the bandwidth when this is not necessary. Indeed, broadcasting a stream in the background or as PiP in a menu is considered, in this type of unicast (or point-to-point) technology, as a waste of overall bandwidth, insofar as this background, or picture-in-picture, stream does not constitute the main focus of interest of the user.

In spite of the many advantages of the HTTP adaptive streaming (HAS) technology, it therefore currently does not make it possible to offer its users the same comfort and the same experience as the multicast techniques.

Therefore, there is a need for a technique that makes it possible, within the scope of an over the top service for the HTTP adaptive streaming of content, to offer a user experience, and particularly an interface, as rich and functional as that proposed within the scope of multicast services, whilst limiting the impact on the total bandwidth consumed.

DESCRIPTION OF THE INVENTION

The invention meets this need by proposing a method for managing the HTTP adaptive streaming (HAS) of digital content within a real-time multimedia stream player terminal, associated with a terminal for rendering the digital content. Such a method comprises a step of obtaining a description file for the digital content, comprising a list of time segments of the content each associated with a plurality of encoding rates of the content. According to the invention, such a method implements during a concomitant rendering, by said rendering terminal, of the digital content and of an element, called main element, belonging to the group comprising a menu and other digital content, a partial download of at least some of said time segments, and a rendering of a picture decoded from the downloaded portion of said corresponding time segment.

Thus, the invention is based on a completely novel and inventive approach of the HTTP adaptive streaming of content within the scope of an OTT service, making it possible to offer the user an interface experience similar to that which is proposed within the scope of multicast content broadcasting techniques.

Indeed, the invention proposes to offer the user, on the rendering terminal, the concomitant rendering, on the one hand, of a main element, which may be a content chosen by the user, or a menu for accessing the service, and on the other hand, of another content, for example a real-time video stream, which is proposed in the background of the main element (for example with an opacity of 50%), or in picture-in-picture form in the screen (for example in a small window in the bottom left of the screen).

In order to be able to offer this experience to the user, without excessively increasing the consumption of bandwidth by the content server, it is proposed to no longer download all of the time segments of the content, but only a portion of these segments. Indeed, a time segment corresponds for example to a portion of the content of one or two seconds: conventionally it starts by an I-picture, also called intra-coded picture. It subsequently contains information making it possible to reconstruct, by motion estimation/compensation, the following pictures of the content, from this I-picture. This information relates to the portions of the picture that change or evolve, in relation to the I-picture, throughout the duration of the time segment.

According to one embodiment of the invention, instead of downloading the complete time segments, only the downloading of a portion of the chunk, ideally the start of the chunk, also called preliminary portion of the chunk, is hence carried out, which makes it possible to decode the I-picture, or intra-coded picture. This preliminary portion of the time segment represents approximately 20% of the total size of the segment in bits. After decoding the I-picture, the latter is rendered to the user throughout the entire duration of the time segment from which it is extracted.

For time segments of a duration of 2 seconds, the picture therefore rendered to the user is refreshed in the background or as PiP approximately every 2 seconds, with each decoding of a new intra-coded picture, associated with a new time segment.

This makes it possible to make an interesting compromise between a rich user interface, making it possible to display a real-time content in the background or as picture in picture on the screen of the rendering terminal, and a limitation of the consumption of network resources by the content server.

Indeed, the video segments broadcast in HAS consist, like conventional videos, of GOP (Group Of Pictures). A GOP consists of a series of pictures grouped in an encoded video stream that is repeated periodically until the end of the encoding. The visible pictures are generated from the pictures contained in a GOP.

Each HAS segment begins with a GOP that itself starts with an I-picture (I-Frame, or intra-coded picture). A GOP contains a single I-picture that corresponds to the first picture to be encoded. It is followed by a succession of P-pictures (predictive-coded pictures) and B-pictures (bidirectionally predictive-coded pictures) the pattern of which repeats until the end of the GOP. The P-pictures are located at regular intervals and the B-pictures complete these intervals.

The specific feature of an I-picture is to be a reference picture the decoding of which does not depend on a preceding or following picture. It may be decoded completely independently of other pictures. The object of one embodiment of the invention is therefore to retrieve the start, or the preliminary portion, of the video segment, which makes it possible to extract the I-picture (in the form of a JPG for example).

It is difficult to know in advance the size in bits of the segments to be downloaded in order to retrieve the entire I-picture. This size depends on the content of the picture itself.

Nevertheless, by arbitrarily deciding to download approximately 20% of the entire segment, it is normally ensured to have downloaded a sufficient portion of the segment in order to decode the I-picture, for example with the aid of tools such as the collection of free software called FFmpeg, intended for the processing of audio or video streams. According to one aspect of the invention, this partial downloading of chunks is carried out at the end of a first period of determined duration of absence of interaction of a user with the real-time multimedia stream player terminal and/or with the rendering terminal. Thus, it is decided to no longer download all of the time segments, but only their preliminary portion, when it is detected that the user no longer interacts with the rendering terminal or the multimedia stream player terminal for a few instants (for example a few minutes).

Thus, the partial downloading (as opposed to the downloading of the segment in its entirety), may be implemented:
- either as soon as a concomitant rendering of a content and of a main element is required, that is to say immediately after the user accesses the service, irrespective of whether or not they interact with the terminals;
- or, in an alternative embodiment, only after a first period of absence of interaction of the user with the rendering terminal, in case of concomitant rendering.

According to a first feature of the invention, the partial downloading relates to a preliminary portion of at least some of said time segments; in this configuration, at the end of a second period of determined duration of absence of interaction of the user with the real-time multimedia stream player terminal and/or with the rendering terminal, the picture is decoded from the preliminary portion of one of the time segments and is rendered for a duration of at least two consecutive time segments.

Thus, the consumption of bandwidth is further reduced, by displaying the intra-coded picture decoded from a time segment of 2 seconds for the duration of two consecutive time segments, i.e. 4 seconds, or even for 6 seconds or more. Therefore, only the preliminary portion of a time segment is downloaded every 4 or 6 seconds, which consumes little resources.

According to another aspect, the partially downloaded time segments are associated with an encoding rate below an optimum encoding rate for rendering the content.

Here, optimum encoding rate means the maximum bitrate of a segment to be downloaded to which the user may be entitled depending on the network conditions, according to the general principle of the HAS download.

Indeed, it is possible to adjust the encoding rate of the time segments that are downloaded, for example by choosing to download the start of an associated time segment at an encoding rate of 512 kb/s, rather than at a maximum available bitrate of 2048 kb/s. Thus, for a video content that, in optimum rendering conditions, is associated with a stream of 25 pictures per second with a specific resolution of 1080 pixels, the method according to the invention acts on the resolution and the time sampling of the stream, by only downloading the start of some of the associated time segments at reduced encoding rates, in order to propose for example to the user a rendering at 10 pictures per minute with a resolution of 576 pixels.

According to an additional aspect, prior to the rendering of the decoded picture, it implements graphics processing of said decoded picture belonging to a group comprising:
- A fade;
- A blur;
- An opacity;
- A graphical transition between said decoded picture and a preceding decoded picture.

Thus, the feeling of the user is improved: indeed, the rendering in the background of the screen of a real-time content of poor quality or resolution may not be very aesthetic. The use of a technique for blurring the picture displayed is a subterfuge making it possible to improve the rendering of the picture for the client, which may further better emphasise and highlight the buttons of the menu, in the case where the content is displayed in the background of buttons for controlling access to the service.

Likewise, it is possible to produce a fade between the successive intra-coded pictures displayed, to improve the impression that the user will have of effectively being in the presence of a video stream. A graphical transition between two consecutive pictures further makes it possible to provide a dynamic aspect to the picture in picture.

It will be noted that the method described above may further have an adaptive character, in this sense that its various aspects and features may be progressively and successively activated, depending on the behaviour of the user, and on the duration of their period of inactivity or interaction with the terminal. For example, first, we begin by only displaying the intra-coded pictures; then, second, we reduce the encoding rate of the time segments of which the preliminary portion is downloaded; finally, third, we increase the time for displaying the decoded intra-coded picture, by therefore reducing the number of partially downloaded time segments, and we introduce for example graphics post-processing of blur or opacity type. Various timers may be implemented to determine the instant at which it is opportune to add a supplementary measure from those listed above, depending for example on the interactions detected of the user with the rendering terminal or the multimedia stream player terminal.

According to yet another aspect, prior to the rendering of the decoded picture, it implements a chrominance determination of the decoded picture and, if the determined chrominance is higher than a chrominance threshold, it implements the partial downloading for at least one neighbouring time segment of the time segment from which the decoded picture is extracted, and a chrominance determination of at least one decoded picture from the at least one neighbouring time segment, called neighbouring decoded picture, and a rendering of one of the neighbouring decoded pictures the determined chrominance of which is lower than the chrominance threshold.

Indeed, insofar as only a picture representative of the content is displayed every 2, 4 or 6 seconds for example, it is important that this picture is effectively representative of the content, and that it makes it possible for the user to identify it. A picture that is too dark for example does not make it possible for the user to recognise the real-time programme displayed on the screen. When an intra-coded picture is decoded from a time segment, its chrominance is therefore determined, and it is disregarded if for example it is more than 50% dark. In this case, for example the preliminary portion of the time segment is downloaded directly before or directly after that from which this picture is extracted. Also, it is possible for example to download the preliminary portions of the two preceding or following time segments. The intra-coded picture of these segments is decoded, its chrominance is calculated, and the picture among these pictures that is the most representative of the video content is rendered on the screen, or more simply the first decoded picture the chrominance of which is satisfactory in order to make it possible for the user to recognise the content.

According to yet another aspect, the digital content is rendered, on a screen of the rendering terminal, in the background of the main element and/or in a window of the screen.

The invention also relates to a computer program product comprising program code instructions for implementing a method as described above, when it is executed by a processor.

The invention also relates to a computer-readable recording medium whereon a computer program is recorded comprising program code instructions for executing the steps of the method for managing the HTTP adaptive streaming according to the invention as described above.

Such a recording medium may be any entity or device capable of storing the program. For example, the medium may include a storage means, such as a ROM, for example a CD ROM or a microelectronic circuit ROM, or also a magnetic recording means, for example a USB key or a hard drive.

On the other hand, such a recording medium may be a transmissible medium such as an electrical or optical signal, which may be routed via an electrical or optical cable, by radio or by other means, so that the computer program that it contains can be executed remotely. The program according to the invention may in particular be downloaded on a network for example the Internet network.

Alternatively, the recording medium may be an integrated circuit wherein the program is incorporated, the circuit being adapted to execute or to be used in the execution of the aforementioned display control method.

The invention also relates to a device for managing the HTTP adaptive streaming (HAS) of digital content within a real-time multimedia stream player terminal, associated with a terminal for rendering said digital content. Such a device comprises a module for obtaining a description file for the digital content, comprising a list of time segments of the content each associated with a plurality of encoding rates of the content.

According to the invention, such a device comprises a module for concomitant rendering of the digital content and of an element, called main element, belonging to the group comprising a menu and other digital content, and a download module configured to implement, during a concomitant rendering, a partial downloading of at least some of said time segments, and the rendering module is configured to render a picture decoded from the downloaded portion of said corresponding time segment.

The invention again relates to a real-time multimedia stream player terminal, which comprises a device for managing the HTTP adaptive streaming of digital content as described above.

The adaptive streaming management device and the multimedia stream player terminal have in combination all or part of the features disclosed in the whole of this document in relation to the adaptive streaming management method.

The abovementioned corresponding adaptive streaming management device, the multimedia stream player terminal and the computer program have at least the same advantages as those conferred by the adaptive streaming management method according to the present invention.

PRESENTATION OF THE FIGURES

Other aims, features and advantages of the invention will become more apparent upon reading the following description, given by way of simple illustrative, and non-limiting example, in relation with the figures, wherein:

FIG. 1 presents a progressive downloading architecture based on the use of the adaptive streaming according to one embodiment of the invention;

FIG. 2 represents an architecture of a real-time multimedia stream player terminal according to one embodiment of the invention;

FIG. 3 illustrates the user interface proposed according to one embodiment of the invention;

FIG. 4 presents a method making it possible to display the content C1 on the interface of FIG. 3 according to one embodiment of the invention.

DETAILED DESCRIPTION OF EMBODIMENTS OF THE INVENTION

The general principle of the invention is based, in order to be able to offer the user an interface experience as rich as within the scope of the video services based on a multicast technology, on an adaptation of the nature of the video stream to be displayed in the background or as picture in picture, within the scope of an OTT service that is based on HTTP adaptive streaming (HAS). More specifically, it is proposed to only download the start of the time segments representative of the stream to be displayed in the background or as PiP, in order to reduce the network stream consumption, and to only render, with an adaptive rate for refreshing the display, the first picture decoded from this chunk start.

It is now presented, in relation to FIG. 1, a progressive downloading architecture based on the use of the adaptive streaming according to the invention.

The terminal 3, for example a smartphone, the terminal 4, for example a laptop computer, and the terminal 8, for example an HDMI key connected to a television 5, are in this example located in a local area network (LAN, 10) controlled by a home gateway 6. The context of the local area network is given by way of example and may be easily transposed to a best effort type Internet network, a corporate network, etc.

A digital content server 2 is according to this example in the wide area network (WAN, 1) but it may indifferently be located in the local area network (LAN, 10), for example in the home gateway 6 or any other equipment capable of hosting such a content server. The content server 2 receives for example digital television contents channels coming from a broadcast television network, not shown, and/or videos on demand, and makes them available for client terminals.

The client terminals 3, 4 and 8 may enter into communication with the content server 2 in order to receive one or more contents (films, documentaries, advertising sequences, etc.).

It is frequent, in this client-server context, to resort, for exchanging data between the client terminals 3, 4 and 8 and the server 2, to an HTTP adaptive streaming technique, HAS for short, based on the HTTP protocol. This type of technique particularly makes it possible to offer a good quality of contents to the user by taking into account bandwidth variations that may occur on the link between the client terminal 3, 4 and 8 and the service gateway 6, or between the latter and the content server 2. Conventionally, various qualities may be encoded for the same content of a channel, corresponding for example to various bitrates. More generally, quality will be mentioned to refer to a certain resolution of the digital content (spatial, temporal resolution, quality level associated with the video and/or audio compression) with a certain bitrate. Each quality level is itself sliced on the content server into time segments (or fragments, chunks, these three words being used indifferently in the whole of this document).

The description of these various qualities and of the associated time segmentation, as well as the content fragments, are described for the client terminal and made available to it via their Internet addresses (URI: Universal Resource Identifier). All of these parameters (qualities, addresses of the fragments, etc.) are in general grouped into a parameter file, called description file. It will be noted that this parameter file may be a computer file or a set of information describing the content, accessible at a certain address.

The terminals 3, 4 and 8 possess their own features in terms of capacity of decoding, of display, etc. In a context of HTTP adaptive streaming, they may adapt their requests to receive and decode the content requested by the user to the quality that best corresponds to them. In our example, if the contents are available at the bitrates 512 kb/s (kilobits per second) (Resolution 1, or level 1, noted N1), 1024 kb/s (N2), 2048 kb/s (N3) and that the client terminal has a bandwidth of 3000 kb/s, it may request the content at any bitrate below this limit, for example 2048 kb/s. Generally, the content number i is noted "Ci@Nj" with the quality j (for example the j-th quality level Nj described in the description file).

The service gateway 6 is in this example a home gateway that ensures the routing of data between the wide area network 1 and the local area network 10, manages the digital contents particularly by ensuring their reception coming from the network and their decoding thanks to the decoders that are assumed here integrated into the gateway 6 or into the client terminals 3, 4 and 8. As a variant, the decoders may be elsewhere in the wide area network 1 or local area network 10, particularly at the level of a STB (Set-Top-Box) type network (not shown) associated with a television.

In this example, to view a content, the terminal 3, 4 or 8 firstly queries the service gateway 6 to obtain an address for the desired description document 7 of the content (for example, C1). The service gateway 6 responds by providing the terminal with the address of the description file 7. In the following, it will be assumed that this file is a manifest type file according to the MPEG-DASH standard (noted "C.mpd") and reference will be made indifferently, according to the context, to the expression "description file" or "manifest".

Alternatively, this file may be retrieved directly from a local Internet server or from one external to the local area network, or already be on the service gateway or on the terminal at the time of the request.

An example of manifest file (MPD) in accordance with the MPEG-DASH standard and including the description of contents available in three different qualities (N1=512 kb/s, N2=1024 kb/s, N3 =2048 kb/s) of the fragmented contents is presented in Appendix 1. This simplified manifest file describes digital contents in an XML (eXtended Markup Language) syntax, comprising a list of contents in the form of fragments conventionally described between an opening tag (<SegmentList>) and a closing tag (</SegmentList>). The slicing into fragments particularly makes it possible to precisely adapt to fluctuations of the bandwidth.

Each fragment corresponds to a certain duration ("duration" field) with a plurality of quality levels and makes it possible to generate their addresses (URL—Uniform Resource Locator). This generation is carried out in this example with the aid of "BaseURL" elements ("HTTP://server.com") that indicates the address of the content server and "SegmentURL" that lists the complementary portions of the addresses of the various fragments:

"C1_512kb_1.mp4" for the first fragment of the content "C1" at 512 kilobits per second ("kb") in MPEG-4 ("mp4") format, "C1_512kb_2. mp4" for the second fragment, etc.

Once it has the addresses of fragments corresponding to the desired content, the service gateway 6 carries out the obtaining of the fragments via a downloading of these addresses. It will be noted that this downloading is carried out here, traditionally, through an HTTP URL, but may also be carried out through a universal address (URI) describing another protocol (dvb://mysegmentofcontent for example).

It is assumed here that the HDMI key 8 is connected to the television 5 by plugging into the HDMI port of the latter, and is used to render, on the screen of the television 5, a television programme broadcast directly, which therefore, by nature, does not have a predetermined duration, or end date. Subsequently, this television programme is designated under the name of content C1. Such a content C1 is described in a manifest file 7.

As a variant, it will be noted that the content C1 may also be a pre-recorded television programme, or a video on demand, or a personal video of the user, or any other multimedia content with predetermined duration, for which the invention also applies.

In this example, the HDMI key 8 is WiFi® connected directly to the residential gateway 6. As a variant, the HDMI key 8 may also be WiFi® connected to another mobile peripheral of the home network, for example to the laptop computer 4 or to the smartphone 3, by way of which it may access the wide area communication network 1.

The HDMI key 8 may also be controlled by the user by means of the smartphone 3, on which a software application for controlling the HDMI key 8 is installed.

The content fragments obtained by the residential gateway 6 are for example transmitted by WiFi® to the HDMI key 8, which controls their display on the screen of the television 5, for rendering to the user.

FIG. 2 represents an architecture of a real-time multimedia stream player terminal according to one embodiment of the invention, for example the HDMI key 8 of FIG. 1.

Conventionally, it comprises memories M associated with a processor CPU. The memories may be of the ROM (Read Only Memory) or RAM (Random Access Memory) or Flash type. The HDMI key 8 communicates with the local area network 10 and the wide area Internet network 1 via the WIFI module for a local wireless communication with the residential gateway 6 or another communication terminal of the local area network 10, for example the smartphone 3. The HDMI key 8 further comprises an HTTP adaptive streaming (HAS) module capable of requesting a progressive downloading of one of the contents with one of the qualities proposed in a description file 7. This description file 7 may be saved for example in the memories M of the HDMI key 8 or be outside.

The HDMI key 8 also comprises a module for progressive adaptation of the quality of an ADAP_Q content, which controls the HTTP adaptive streaming (HAS) module. This ADAP_Q module commands the HTTP adaptive streaming (HAS) module to only download certain portions of time segments, ideally the preliminary portions of these segments, in order to extract therefrom the first picture representative of the segment, or intra-coded picture. Furthermore, it may force the latter to request a progressive downloading of these segments with a quality, proposed in the description file 7, lower than the optimum quality to which they may be entitled. It may also select only certain time segments to be partially downloaded, depending on the rate for refreshing the display of the desired intra-coded pictures, particularly depending on the interactions detected of the user with the HDMI key 8 or the rendering terminal, for example the TV 5.

The HDMI key 8 also comprises a DEC module for decoding the intra-coded pictures from the downloaded preliminary portions of time segments, which is also capable of performing processing on these decoded pictures, such as a calculation of the chrominance of these pictures, to decide on their representativeness of the content, and miscellaneous graphics post-processing, such as an application of a blur, of an opacity, or of a fade.

The HDMI key 8 according to the invention may also contain other modules such as a hard drive not shown for storing the video fragments, a module for controlling access to the contents, a module for processing the commands received from a tablet or from a smartphone on which the application for controlling the HDMI key is installed, thanks to which the user may control therefrom the operation, etc. Indeed, such an HDMI key 8 generally does not contain an I/O interface module, and the I/O interface module of the smartphone of the user or of their tablet is used by the latter to choose for example its content.

The HDMI key 8 also integrates an interface management module INT with the television 5, by which it obtains for example information relating to the possible interactions of the user with the television 5 (action on the remote control of the television for example by pressing on the volume key or a key for changing channel), and by which it may control for example the concomitant display on the screen of the television 5 of a menu and of a real-time content in the background, or in a PiP type window, for example in the bottom left corner of the screen.

It will be noted that the term module may correspond to a software component as well as a hardware component or a set of software and hardware components, a software component itself corresponding to one or more computer programs or subprograms or more generally to any element of a program capable of implementing a function or a set of functions such as described for the modules concerned. In the same manner, a hardware component corresponds to any element of a hardware assembly capable of implementing a function or a set of functions for the module concerned (integrated circuit, smart card, memory card, etc.).

More generally, such an HDMI key 8 comprises a random access memory (for example a RAM memory), a processing unit equipped for example with a processor CPU, and controlled by a computer program, representative of a module for managing the HTTP adaptive streaming (HAS), stored in a read-only memory (for example a ROM memory or a hard drive). Upon initialisation, the code instructions of the computer program are for example loaded into the random access memory before being executed by the processor CPU of the processing unit. The random access memory particularly contains the manifest description file 7. The processor of the processing unit controls the evaluation of the presence or of the absence of interactions of the user with the HDMI key 8 or the television 5, the display of background or picture-in-picture content on the screen of the television 5, the possible graphics post-processing that is applied to it prior to display, and the progressive reduction of the quality and of the rate for refreshing the display of the downloaded content, through the choice of the associated time segments and encoding rates to be downloaded, the decoding of intra-coded pictures that are extracted therefrom, and the emission of corresponding commands towards the HAS client module.

FIG. 2 only illustrates a particular way, from a plurality possible, to produce the HDMI key 8, so that it performs the steps of the method detailed hereafter, in relation to FIG. 4 (in any one of the various embodiments, or in a combination of these embodiments). Indeed, these steps may be performed indifferently on a reprogrammable calculation machine (a PC computer, a DSP processor or a microcontroller) executing a program comprising a sequence of instructions, or on a dedicated calculation machine (for example a set of logic gates such as a FPGA or an ASIC, or any other hardware module).

FIG. 3 offers an overview of the user interface proposed according to one embodiment of the invention, for example on the screen of the television 5. When the user accesses the OTT type television service, first of all they access a main menu, also called "desk" within the scope of the service proposed by Orange®. According to the prior art, when the user accesses this main menu, the screen of the television 5 only displays a set of buttons M, making it possible for the user to access the various functionalities of the service (choice of the content, adjustment of the sound level, etc.).

According to one embodiment of the invention on the other hand, the real-time content C1 is also displayed in the background on the screen, in overlay with the buttons M of the main menu, for example with an opacity of 50%. As a variant, this content C1 may be displayed, not in the background, but in a dedicated window on the screen, in picture-in-picture form. This PiP type technique may also be used, according to one embodiment of the invention, to make it possible for the user to view a content C2 on the screen, in high resolution, whilst keeping an eye on a content C1, displayed in a window of reduced size in a corner of the screen, for example to make it possible for them to detect the start of a specific television programme on another channel.

The flow chart in FIG. 4 details more specifically the method making it possible to display this content C1 according to one embodiment of the invention. This method is implemented by a real-time multimedia stream player terminal 30, for example the HDMI key 8 of FIG. 1 and FIG. 2.

The real-time multimedia stream player terminal 30 is connected to a television TV 5, by way of an HDMI link. It comprises an INT module for interfacing with the television 301, an ADAP_Q module 302 for progressively adapting the quality of a content rendered in the background or as PiP, and an HAS client module 303.

A HAS content server 2 discloses a video C1 in the form of chunks $C1_i@Nj$ encoded at various encoding rates Nj, where the index i designates a time identifier of the chunk $C1_i@Nj$.

According to the prior art, a HAS client module is loaded to come to retrieve these chunks from the HAS content server 2 by choosing the video quality Nj depending on the available network resource. It is not described in more detail here the manner in which the HAS client module chooses the encoding rate of the next video fragment to be downloaded: indeed many algorithms exist making it possible to make this choice, the strategies of which are more or less secure or aggressive.

However, it is reminded that, most often, the general principle of such algorithms is based on the downloading of a first fragment at the lowest encoding rate proposed in the manifest, on the evaluation of the time for retrieving this first fragment. On this basis, the HAS client module evaluates whether, depending on the size of the fragment and of the time taken to retrieve it, the network conditions make it possible to download the following fragment at a higher encoding rate. Certain algorithms are based on a progressive increase of the quality level of the downloaded content fragments; others propose riskier approaches, with jumps in the levels of the encoding rates of the successive fragments.

In the conventional case, if a video chunk lasts 3 seconds, the retrieval of the chunk by the HAS client module must not exceed 3 seconds, in order to make it possible to render without interruption the content by the terminal 30. Therefore, the HAS client module should make the best compromise between a rendering quality, and therefore an encoding rate, as high as possible, and the time for downloading the fragment, which must be short enough to make it possible to continuously render on the television 5.

In the embodiment illustrated in FIG. 4, on the other hand, the HAS client module 303 does not command the downloading of the fragment in its entirety, or the optimum encoding rate, in order to optimise the consumption of network resources, particularly in the case where it is detected that the user does not interact with the rendering terminal 5, or the HDMI key 8.

During a step referenced 310, the HAS module 303 retrieves the manifest file 7 in order to discover the available fragments of the video content C1, and the various associated video qualities Nj. In the example in FIG. 4, the content C1 is for example proposed in the form of fragments of duration 2s, with a first encoding rate N1=500 kb/s, a second encoding rate N2=1000 kb/s, a third encoding rate N3=2000 kb/s, etc.

In a normal operating mode, not illustrated in FIG. 4, the HAS module 303 carries out the downloading for example, of successive fragments $C1_1@Nl$ (i.e. the first time fragment at an encoding rate of 500 kb/s), then $C1_2@N3$ (i.e. the second time fragment at an encoding rate of 2000 kb/s), then $C1_3@N3$ (i.e. the time fragment at an encoding rate of 2000 kb/s), etc.

The algorithm implemented by the HAS client module 303 to determine which fragment at which encoding rate must be downloaded in normal operating mode (that is to say outside of the periods where it is controlled by the ADAP_Q module 302 for progressive adaptation of the rendering quality of the background or picture-in-picture content C1) may be one of the already existing algorithms of the prior art. This algorithm will therefore not be described here in more detail.

The various fragments downloaded by the HAS client module 303 are transmitted to the interface module INT 301 for their rendering to the user on the screen of the television TV 5.

This is the case for example when the user activates the HDMI key 8 and the television 5 to access the television service: first, the main menu is displayed, with in the background the real-time content C1, corresponding to one of the televised programmes.

At the same time, in accordance with FIG. 4, the INT module 301 monitors the interactions of the user with the television 5, and receives for example, via the HDMI port, information relating to the actions performed by the users on the remote control of the television 5 and on the television 5 itself. It transmits this information to the ADAP_Q module 302, which also receives information relating to the possible interactions of the user with the terminal 30 itself, via its remote control or a control terminal of smartphone or tablet type.

The ADAP_Q module 302 initiates for example a timer, for example for a duration of ten or fifteen minutes, during the activation of the HDMI key 8 and of the television 5. During this first period, the INT module 301 monitors the activity of the user. If, at the expiry of this timer, no interaction of the user with the equipment for rendering the contents has been detected, the ADAP_Q module 302 initiates the adaptation of the nature of the video stream C1, in order to reduce the consumption of the network resources.

As a variant, this adaptation of the nature of the video stream may be implemented immediately, as soon as the user accesses the service and this, irrespective of whether or not he/she interacts with the terminals.

First, this adaptation involves, for the ADAP_Q module 302, commanding the HAS downloading module 303 to only download the preliminary portions of the time segments $C1_i@Nj$, for example only 20% of the size of the chunk in bits, corresponding to the start of the time segment, making it possible to decode the intra-coded picture that it contains. In the case where the content C1 is not rendered in the background but as picture in picture in a PiP type window, it may be decided to download a portion of the time segment proportional to the size of the window in which it is rendered: for example, if the surface area of the PiP window represents 10% of the total size of the screen of the television 5, the ADAP_Q module 302 may decide to download portions of time segments corresponding, in volume, to 10% of the main stream of the content C1.

More generally, by choosing to download 20% of the size of the chunk in bits, it is normally guaranteed to retrieve a sufficient preliminary portion of the chunk to succeed in extracting therefrom the unique I-picture that it contains, for example in jpg format, by using a FFmpeg type software tool. But it can also be envisaged that the ADAP_Q module 302 implements an adaptive algorithm making it possible to determine the optimum chunk portion to be downloaded, i.e. the portion of the chunk necessary and sufficient for the extraction of the intra-coded picture. Thus, the ADAP_Q module 302 may, on a first time segment, initialise at 20% the portion of the segment to be downloaded. If this portion, representing 20% of the size of the segment in bits, is sufficient for extracting therefrom the I-picture, the ADAP_Q module 302 may incrementally reduce the portion to be downloaded for the following segment, for example by reducing by 1% the amount of data to be retrieved on this next segment, i.e. 19%. In the case of successful extraction of the intra-coded picture from this 19% portion, the ADAP_Q module 302 may continue to reduce the portion of the next segment to be downloaded, incrementally, until the I-picture extracted from this portion is not complete, because the ADAP_Q module 302 has not retrieved enough bits from the start of the segment. The ADAP_Q module 302 then reverts to the preceding value, and freezes this value as being the optimum value, that is to say necessary and sufficient, for completely extracting the intra-coded picture of the segment.

Upon expiry of the first timer, the ADAP_Q module 302 then initiates for example a second timer, and the INT module 301 continues to monitor the possible actions of the user.

For the duration of this second timer, the ADAP_Q module 302 commands the rendering, in the background of the screen of the television 5, of an intra-coded picture extracted from the segment $C1_i@Nj$ for the entire duration of this segment, i.e. for example two seconds. Every two seconds, the display is refreshed, by proposing to the user the intra-coded picture extracted from the various successive time segments.

It is therefore not possible for the users to view the true video stream associated with the content C1, but it is proposed to them an interface making it possible for them to have an overview that evolves of this content.

This second timer may also be independent of the detection or not of interactions of the user with the terminals, and only be used to trigger a new step of adapting the content.

At the end of this second timer, if no interaction of the user is detected, the ADAP_Q module 302 may decide on a new adaptation of the quality of the rendering of the content C1 to the user. For example, this adaptation may involve no longer displaying an intra-coded picture by time segment, but only downloading the start of one time segment out of two or the start of one time segment out of three, in order to display an intra-coded picture, no longer for the duration of one but of two or three successive segments, i.e. for four or six seconds. Thus, the rate for refreshing the display of the background or picture-in-picture content on the screen of the television 5, and therefore the consumption of network resources is reduced.

In this case, it is however important that the picture, which will be displayed for a plurality of seconds to the user, is effectively representative of the content C1, so that the user can identify it. This is not the case if the picture is too dark, for example because it is extracted from a night-time scene. Before the INT module 301 controls the display of the I-picture decoded from one of the time segments on the screen of the television 5, the DEC module 304 carries out a chrominance calculation on the decoded intra-coded picture. A threshold is determined, for example in the order of 50%. If the chrominance value calculated for the picture is below the threshold of 50%, the picture contains little colour information, and is therefore too dark to be effectively representative of the content. Therefore, it is not displayed on the screen of the television 5.

In this case the ADAP_Q module 302 commands the HAS module 303 to download the start of one or of two time segment(s) preceding and/or following the chunk from which the picture that is too dark has been extracted. Corresponding intra-coded pictures are extracted from these partially downloaded time segments. The DEC module 304 carries out the calculation of their chrominance, in order to determine which of these pictures is the most representative of the content C1, and that should therefore be displayed for a better rendering to the user. More simply, the DEC module 304 successively carries out the calculation of the chrominance of these various pictures and as soon as it identifies a picture of which the chrominance value is satisfactory for faithfully representing the content C1, the INT module 301 controls the display of this picture on the screen of the television 5.

It may also be imagined that a third timer is triggered during this adaptation of the refresh rate and that a new evolution is decided by the ADAP_Q module 302 at the end of this third timer if the user still does not interact with the rendering terminal. This new evolution may for example involve a reduction of the encoding rate of the time segments of the content C1 partially downloaded by the HAS module 303. For example, the HAS module 303 changes from a downloading of preliminary portions of time segments at 3000 kb/s to a downloading of preliminary portions of time segments at 500 kb/s.

Thus, as illustrated in FIG. 4, the HAS client module 303 will successively download (312) the starts of the fragments $C1_2@N4$, $C1_3@N3$, $C1_4@N2$ and $C1_5@N1$, to reduce the rendering quality of the content C1, as illustrated by the arrow referenced 311, up to the lowest quality proposed in the manifest 7, corresponding to a bitrate of 500 kb/s.

In practice, the reduction 311 of encoding rates of the time fragments is not necessarily as fast, but may be spread over time, for example over a period of one hour. FIG. 4 therefore corresponds to a simplified illustration of this principle, making it possible to understand it visually. For example, the HAS client module 303 controls the partial downloading of successive time fragments with the quality level N4 for a duration of fifteen minutes, then lowers this level by downloading the start of the time fragments with the quality level N3 for the following quarter of an hour, and so on, until the lowest quality level N1 provided for in the manifest 7 is reached, after approximately one hour.

It will be noted that the order of these various adaptations and associated timers is only given by way of example and may be modified: for example, it may be decided to reduce the encoding rate, before reducing the rate for refreshing the rendered content.

The ADAP_Q module 302 may further command the implementation of graphics post-processing of the intra-coded pictures decoded and extracted from the time segments by the DEC module 304. For example, a blur may be applied on the intra-coded picture rendered in the background to the user on the screen of the television 5. This is particularly advantageous when the resolution of the content C1 is reduced, in order to improve the rendering and the experience of the user. This technique further makes it possible to better highlight the buttons M of the main menu overlaid on the content C1, and therefore to draw the attention of the user to the latter.

Other graphics processing techniques may also be implemented, such as the application of a black fade, or the production of a fade between the successive intra-coded pictures displayed, in order to increase the feeling of the user that they are in fact in the presence of a true video stream.

If, at any moment, the INT module 301 detects that the user manifests his/her presence by actuating the remote control of the television 5, or by action on the smartphone 3 controlling the terminal 30, the ADAP_Q module 302 may send to the HAS client module 303 a command to return to the normal. If the user has for example chosen, via one of the buttons of the menu M, to view in full screen the real-time content C1, the HAS client module 303 then determines, depending on the network conditions, the optimum bitrate of the time fragment to which it may be entitled, and launches the download of the next fragment at this optimum bitrate.

As a variant, it is possible to not carry out this return to the normal, even if it is detected that the user interacts with the multimedia stream player terminal, or the rendering terminal, in order to optimise the consumption of network resources.

APPENDIX 1: exemplary of manifest file digest file

```
<?xml version="1.0"?>
<MPD xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011
    DASH-MPD.xsd"
    type="dynamic" profiles="urn:mpeg:dash:profile:isoff-live:2011">
<Representation id="0" codecs="avc1" mimeType="video/mp4"
    width="1024" height="768" startWithSAP="1" bandwidth="46986">
<BaseURL>HTTP://server.com/</BaseURL>
<!-- Content C1 at N1=512kb -->
<SegmentBase>
    <Initialization
      sourceURL="C1_15sec_512kb/C1_512kbit_dash.mp4"/>
</SegmentBase>
<SegmentList duration="10">
    <SegmentURL media="C1_512kb_1.mp4"/>
    <SegmentURL media=" C1_512kb _2.mp4"/> ....
</SegmentList>
<!-- Content C1 at N2=1024kb -->
<SegmentBase>
    <Initialization
      sourceURL="C1_15sec_500kbit/C1_1024kbit_dash.mp4"/>
</SegmentBase>
<SegmentList duration="10">
    <SegmentURL media="C1_512kb_1.mp4"/>....
</SegmentList>
<!-- Content C1 at N3=2048kb -->
<SegmentBase>
    <Initialization sourceURL="C1_15sec_512kb
      /C1_2048kbit_dash.mp4"/>
</SegmentBase>
<SegmentList duration="10">
    <SegmentURL media="C1_2048kb_1.mp4"/>...
</SegmentList>
<!-- Content C2 at N1=512kb -->
<SegmentBase>
    <Initialization sourceURL="
      C2_15sec_500kbit/C2_512kbit_dash.mp4"/>
</SegmentBase>
<SegmentList duration="10">
    <SegmentURL media=" C2_512kb_1.mp4"/> ....
</SegmentList>
<!-- Content C2 at N2=1024kb -->
<SegmentBase>
    <Initialization
      sourceURL="C2_15sec_500kbit/C1_1024kbit_dash.mp4"/>
</SegmentBase>
<SegmentList duration="10">
    <SegmentURL media="C2_1024kb_1.mp4"/>....
</SegmentList>
<!-- Content C2 at N3=2048kb -->
<SegmentBase>
    <Initialization
      sourceURL="C2_15sec_500kbit/C1_2048kbit_dash.mp4"/>
</SegmentBase>
<SegmentList duration="10">
    <SegmentURL media="C1_2048kbit_1.mp4"/>...
</SegmentList>
    ....
</SegmentList>
</MPD>
```

The invention claimed is:

1. A method for managing HTTP adaptive streaming of digital content within a real-time multimedia stream player terminal, associated with a terminal for rendering said digital content, said method comprising:

obtaining a description file for said digital content, comprising a list of time segments of said content each associated with a plurality of encoding rates of said content; and during a concomitant rendering, by said rendering terminal, of said digital content and of an element, called main element, belonging to a group comprising a menu and other digital content, a partial downloading of at least some of said time segments, and rendering, a picture decoded from the downloaded portion of said corresponding time segment.

2. The method according to claim 1, wherein the partial downloading is implemented at an end of a first period of determined duration of absence of interaction of a user with said real-time multimedia stream player terminal and/or with said rendering terminal.

3. The method according to claim 2, wherein the partial downloading relates to a preliminary portion of at least some of said time segments, and at an end of a second period of determined duration of absence of interaction of said user with said real-time multimedia stream player terminal and/or with said rendering terminal, said picture is decoded from said preliminary portion of one of said time segments and is rendered for a duration of at least two consecutive time segments.

4. The method according to claim 1, wherein the partially downloaded time segments are associated with an encoding rate below an optimum encoding rate for rendering the content.

5. The method according to claim 1, wherein, prior to said rendering of said decoded picture, the method implements graphics processing of said decoded picture belonging to a group consisting of:
 a fade;
 a blur;
 an opacity;
 a graphical transition between said decoded picture and a preceding decoded picture.

6. The method according to claim 1, wherein prior to said rendering of said decoded picture, the method implements a chrominance determination of said decoded picture and, if the determined chrominance is higher than a chrominance threshold, the method implements said partial downloading for at least one neighbouring time segment of said time segment from which said decoded picture is extracted, and a chrominance determination of at least one decoded picture from said at least one neighbouring time segment, called neighbouring decoded picture, and a rendering of one of said neighbouring decoded pictures the determined chrominance of which is lower than said chrominance threshold.

7. The method according to claim 1, wherein the method comprises the rendering terminal rendering the digital content, on a screen of said rendering terminal, in a background of said main element and/or in a window of said screen.

8. A non-transitory computer-readable medium comprising program code instructions stored thereon for implementing a method of managing HTTP adaptive streaming of digital content, when the instructions are executed by a processor of a real-time multimedia stream player terminal, associated with a terminal for rendering said digital content, said method comprising:

obtaining a description file for said digital content, comprising a list of time segments of said content each associated with a plurality of encoding rates of said content; and during a concomitant rendering, by said rendering terminal, of said digital content and of an element, called main element, belonging to a group comprising a menu and other digital content, a partial downloading of at least some of said time segments, and rendering, a picture decoded from the downloaded portion of said corresponding time segment.

9. A device for managing the HTTP adaptive streaming of digital content within a real-time multimedia stream player terminal, associated with a terminal for rendering said digital content, said device comprising:
- a processor; and
- a non-transitory computer-readable medium comprising instructions stored thereon which when executed by the processor configure the device to:
- obtain a description file for said digital content, comprising a list of time segments of said content each associated with a plurality of encoding rates of said content,
- concomitantly render said digital content and an element, called main element, belonging to a group comprising a menu and other digital content, and implement, during a concomitant rendering, a partial downloading of at least some of said time segments, and said rendering module is configured to render, a picture decoded from said downloaded portion of the downloaded time segment.

10. The real time multimedia stream player terminal, wherein the terminal comprises the device for managing the HTTP adaptive streaming of digital content according to claim 9.

11. The method according to claim 1, wherein the partial downloading relates to a preliminary portion of at least some of said time segments, said preliminary portion comprising a reference picture of a group of pictures comprised in said time segments.

12. The method according to claim 11, wherein the preliminary portion comprises at least 20% of a total size of said time segments in order to make it possible to extract said reference picture.

* * * * *